United States Patent [19]
Headley

[11] Patent Number: 5,803,494
[45] Date of Patent: Sep. 8, 1998

[54] AIR BAG INFLATOR

[75] Inventor: Paul S. Headley, Mesa, Ariz.

[73] Assignee: TRW Inc., Lyndhurst, Ohio

[21] Appl. No.: 692,945

[22] Filed: Aug. 7, 1996

[51] Int. Cl.⁶ .................................................. B60R 21/26
[52] U.S. Cl. .......................... 280/741; 280/736; 280/737; 280/742
[58] Field of Search .................................. 280/741, 742, 280/736, 737; 102/530, 531

[56] References Cited

U.S. PATENT DOCUMENTS 3,985,375 10/1976 Lewis et al. .
5,566,976 10/1996 Cuevas ..................................... 280/742
5,690,357 11/1997 Cuevas ..................................... 280/736

OTHER PUBLICATIONS

U.S. Patent Appln. S/N 08/523,017, filed Sep. 1, 1995 for Dual Stage Air bag Bag Inflator with Toroidal Chamber for Combustible Gas Mixture.

*Primary Examiner*—Eric D. Culbreth
*Attorney, Agent, or Firm*—Tarolli, Sundheim, Covell, Tummino & Szabo

[57] ABSTRACT

An apparatus (24) for inflating an inflatable vehicle occupant protection device (22) comprises a container (40) which defines a chamber (42) for material which effects inflation of the protection device. The container (40) includes an opening (60) of a flow area through which fluid flows to inflate the protection device (22). A rupturable closure (64) blocks fluid flow through the opening (60) in the container (40). A first actuatable initiator (164), upon actuation, effects the rupture of the closure (64). A member (120) is movable from a first position in which the flow of fluid through the opening (60) is unrestricted when the closure (64) is ruptured. The member (120) is movable to a second position in which fluid flow through the opening (60) is restricted by a portion of the member to reduce the flow area of the opening. A second actuatable initiator (162), upon actuation, moves the member (120) from the first position to the second position and effects the rupture of the closure (64).

20 Claims, 3 Drawing Sheets

AIR BAG INFLATOR

BACKGROUND OF THE INVENTION

1. Technical Field

The present invention relates to an inflator for inflating an inflatable vehicle occupant protection device, such as an air bag.

2. Description of the Prior Art

Inflators for inflating inflatable vehicle occupant protection devices, such as air bags, are known. A known inflator, upon actuation, provides gas to inflate the air bag between a vehicle occupant and a part of the vehicle. The inflated air bag helps protect the occupant from forcefully striking or being struck by the vehicle part.

The inflator typically includes a container which defines a chamber. An inert gas, a gas mixture including an inert gas and a combustible gas, a solid pyrotechnic material, or a solid pyrotechnic material and an inert gas may be located in the chamber. When the inflator is actuated, gas is discharged from the container to inflate the air bag.

SUMMARY OF THE INVENTION

The present invention is directed to an apparatus for inflating an inflatable vehicle occupant protection device. The apparatus is capable of inflating the protection device at two different rates of inflation.

The apparatus comprises a container which defines a chamber. Material which effects inflation of the protection device is in the chamber. The container includes a first opening of a first flow area through which fluid flows to inflate the protection device. A rupturable first closure blocks fluid flow through the first opening in the container when the first closure is unruptured. First actuatable means, upon actuation, effects the rupture of the first closure. A member is movable from a first position in which fluid flow through the first opening is unrestricted when the first closure is ruptured. The member is movable to a second position in which fluid flow through the first opening is restricted by a portion of the member. Second actuatable means, upon actuation, moves the member from the first position to the second position and effects the rupture of the first closure.

The member includes a second opening of a second flow area through which fluid flows to inflate the protection device when the member is in the second position. The second flow area is less than the first flow area. A rupturable second closure inhibits fluid flow through the second opening when the second closure is unruptured. The second closure ruptures in response to actuation of the second actuatable means. Fluid flows through the first and second openings when the member is in the second position. The rate at which fluid flows through the second opening in the member is less than the rate at which fluid flows through the unrestricted first opening in the container. The apparatus further includes control means for actuating only one of the first and second actuatable means.

The member is preferably located inside of the container. The container includes means for guiding movement of the member from the first position to the second position. The guiding means comprises a guide wall which is fixed to the container and extends from the container into the chamber. The guide wall encircles the first opening in the container. The guide wall includes a first passage and a second passage which permit fluid flow between opposite sides of the guide wall. The first passage is spaced from the second passage in the direction that the member moves. When the member is in the first position, fluid flow through the first passage in the guide wall is permitted and fluid flow through the second passage is inhibited. When the member is in the second position, fluid flow through the second passage in the guide wall is permitted and fluid flow through the first passage is inhibited.

The material in the chamber preferably comprises fluid stored under pressure. The first and second actuatable means produce, upon actuation, combustion products which effect heating of fluid in the chamber and increase the pressure in the chamber to a predetermined pressure at which the first closure ruptures. The fluid preferably comprises a mixture of gases including a combustible gas and an inert gas. Combustion products produced by either of the first and second actuatable means ignite the combustible gas to heat the mixture of gases and increase pressure in the chamber.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 1:
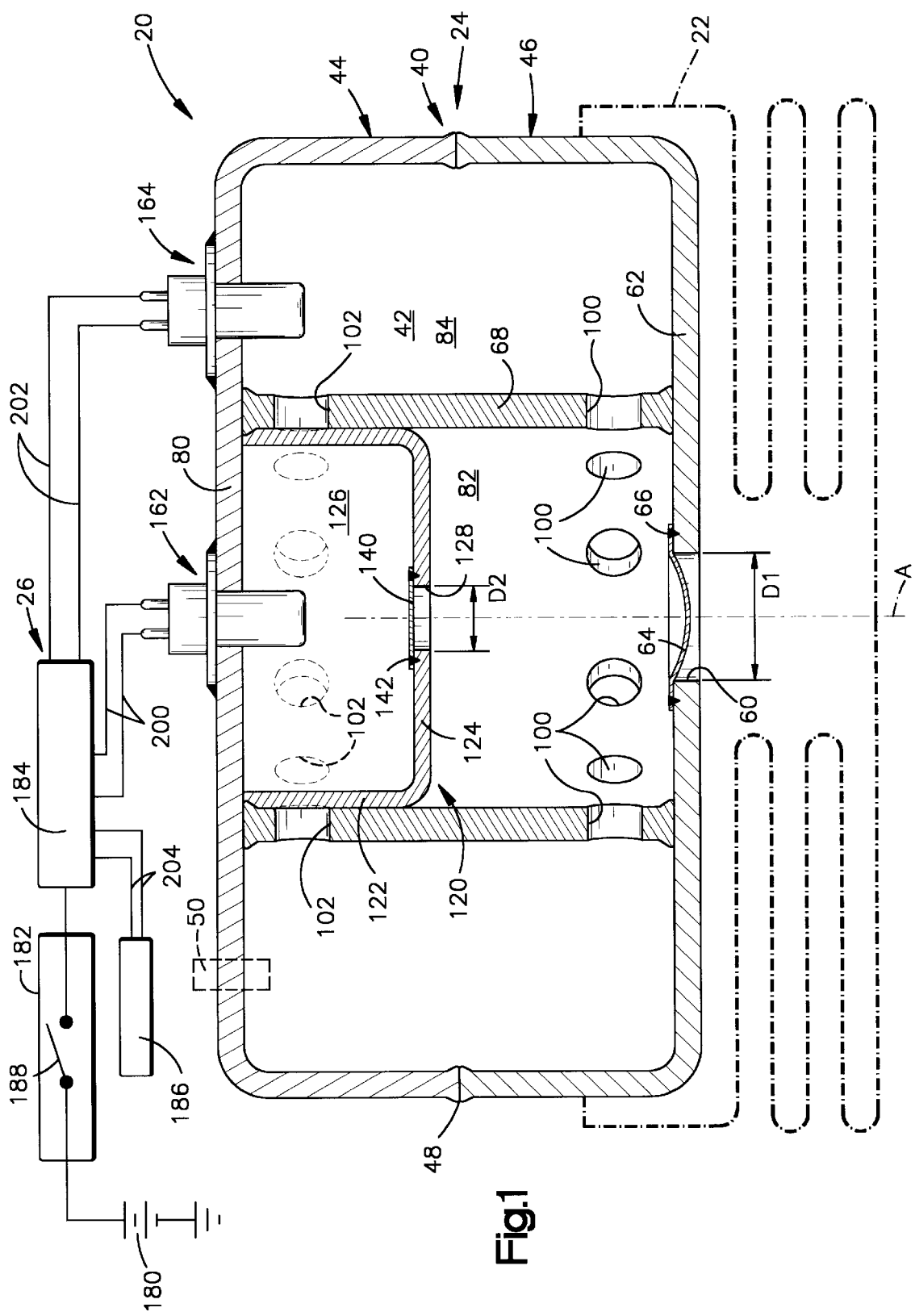
FIG. 1 is a schematic view of an inflatable occupant protection system including an inflator embodying the present invention.

An inflatable vehicle occupant protection system 20 (FIG. 1) includes an inflatable vehicle occupant protection device, such as an air bag 22. The protection system 20 also includes an inflator 24, constructed in accordance with the present invention, and an electrical actuation circuit 26. The air bag 22 and the inflator 24 may be parts of a module which is attached to a part of a vehicle, such as a steering wheel, an instrument panel, a door, a seat or a side panel. The air bag 22 is attached directly to the inflator 24, as schematically illustrated in FIG. 1, or may otherwise communicate with the inflator.

The circuit 26 provides electrical energy to actuate the inflator 24 for inflating the air bag 22. The circuit 26 delivers electrical energy to the inflator 24 in response to the occurrence of an event, such as a collision of the vehicle having a severity above a predetermined severity or deceleration of the vehicle above a predetermined deceleration, for which inflation of the air bag 22 is desired. Upon actuation of an inflator 24, the air bag 22 inflates to a position between the occupant of the vehicle and the part of the vehicle to help protect the occupant from forcibly striking or being struck by the part.

The inflator 24 includes a container 40 with a longitudinal central axis A. The container 40 defines a chamber 42 which is located along the axis A. The chamber 42 receives and holds a mixture of gases.

The container 40 includes a cup shaped upper container portion 44 and a cup shaped lower container portion 46 which open toward each other, as viewed in FIG. 1. The upper container portion 44 engages and is fixed to the lower container portion 46 at a continuous circumferential friction weld 48. The container 40 includes a known fill port 50 for introducing the mixture of gases into the chamber 42.

The container 40 is made of a material that is impervious to the mixture of gases in the chamber 42. The container 40 is preferably made from metal, such as stainless steel or aluminum. The container 40 may also be made from carbon steel and the chamber 42 lined with a suitable material, such as glass, that is impervious to the mixture of gases.

The mixture of gases in the chamber 42 includes a combustible gas and a noncombustible gas. The combustible gas in the mixture of gases comprises a fuel gas. An oxidizer in the mixture of gases supports combustion of the fuel gas. The fuel gas is preferably hydrogen. The oxidizer gas is preferably oxygen. The noncombustible gas in the mixture of gases is an inert gas. The inert gas is preferably nitrogen, argon or a mixture of nitrogen and argon.

The fuel gas in the mixture of gases in the chamber 42 of the container 40 readily ignites, but otherwise is not explosive. The mixture of gases could have many different compositions. Preferably, the mixture of gases includes 10–14 molar percent hydrogen, 15–25 molar percent oxygen, and 61–75 molar percent nitrogen.

The mixture of gases is stored in the chamber 42 under pressure. The pressure of the mixture of gases in the chamber 42 depends on factors such as the volume of the air bag 22 to be inflated, the time available for inflation, the inflated air bag pressure desired, the volume of the chamber 42, the temperature of the container 40 and the percentage of each of the gases in the mixture of gases. Preferably, the mixture of gases in the chamber 42 is stored at a pressure in the range of about 2,000 psi to 5,000 psi, and preferably about 4,000 psi when the inflator 24 is at room temperature.

The lower container portion 46 includes an end wall 62. An opening 60 is centrally located in the end wall 62 along the axis A. Fluid flows from the chamber 42 through the opening 60 in the lower container portion 46 of the container 40 to inflate the air bag 22.

The opening 60 is circular and has a diameter D1. The opening 60 defines a first flow area through which fluid flows to inflate the air bag 22. When the opening 60 is unrestricted, fluid flows through the opening to inflate the air bag 22 at a relatively high rate.

A closure 64 extends across the opening 60 and is fixed to the end wall 62 of the lower container portion 46 of the container 40 by a laser weld 66. The weld 66 is continuous and extends circumferentially around the opening 60 to block fluid flow through the opening when the closure is unruptured. The closure 64 thus blocks fluid flow from the inflator 24 to the air bag 22. The closure 64 ruptures in response to pressure of the mixture of gases in the chamber 42 increasing to a predetermined pressure.

The container 40 includes a cylindrical guide wall 68 which is located in the chamber 42. The guide wall 68 extends between the end wall 62 of the lower container portion 46 and an end wall 80 of the upper container portion 44. The guide wall 68 is welded at opposite ends to the end walls 62, 80 of the container 40 by friction welds. The guide wall 68 extends concentrically around the opening 60 in the end wall 62.

The guide wall 68 separates the chamber 42 into an inner chamber portion 82 and an outer chamber portion 84. The inner chamber portion 82 is located along the axis A of the container 40. The outer chamber portion 84 encircles the guide wall 68 and the inner chamber portion 82.

A plurality of passages 100 extend radially through a lower end portion of the guide wall 68, as viewed in FIG. 1. The passages 100 are arranged in a circumferential array around the guide wall 68. The passages 100 permit flow through the lower end portion of the guide wall 68 between the inner chamber portion 82 and the outer chamber portion 84.

A plurality of passages 102 extend radially through an upper end portion of the guide wall 68, as viewed in FIG. 1. The passages 102 are arranged in a circumferential array around the guide wall 68. The passages 102 permit fluid flow through the upper portion of the guide wall 68 between the inner chamber portion 82 and the outer chamber portion 84. The lower passages 100 are spaced from the upper passages 102 in a direction which is parallel to the axis A and in which the guide wall 68 extends from the end wall 62 of the lower container portion 46 of the container 40.

A piston member 120 is located in the inner chamber portion 82. The piston member 120 is cup shaped and has a cylindrical piston side wall 122 and a piston end wall 124. The piston member 120 opens toward the end wall 80 of the upper container portion 44, and the end wall 124 of the piston member is spaced from the end wall of the upper container portion. The side wall 122 of the piston member 120 fits tightly within the guide wall 68. The piston member 120 is movable within guide wall 68 and cooperates with the container 40 to define an expansible chamber 126 within the inner chamber portion 82 of the chamber 42.

The piston member 120 has an opening 128 which is located centrally in the piston end wall 124 and along the axis A of the container 40. The opening 128 is circular and has a diameter D2 which is less than the diameter D1 of the opening 60. The opening 128 defines a flow area which is less than the flow area of the opening 60.

A closure 140 extends across the opening 128 in the piston member 120. The closure 140 is welded to the end wall 124 by a laser weld 142. The closure 140 is rupturable and cooperates with the piston member 120 to define the chamber 126.

The weld 142 may optionally be discontinuous. The closure 140 may optionally have a relatively small opening. The piston member 120 may optionally have an opening and an annular channel extending around the exterior of the piston side wall 122. The opening would be in fluid communication with the channel. The opening and channel would be initially aligned with the passages 102 in the upper end portion of the guide wall 68 when the piston member 120 is in the initial position. Any of these options allow limited fluid communication between the chamber 126 and at least one of the chamber portions 82 or 84 to prevent unintended rupturing of the closure 140, especially when the chamber 42 is being filled with the mixture of gases. The limited fluid communication would also be such that a pressure differential can occur between the chamber 126 and the inner chamber portion 82 to move the piston member 120.

Figure 2:
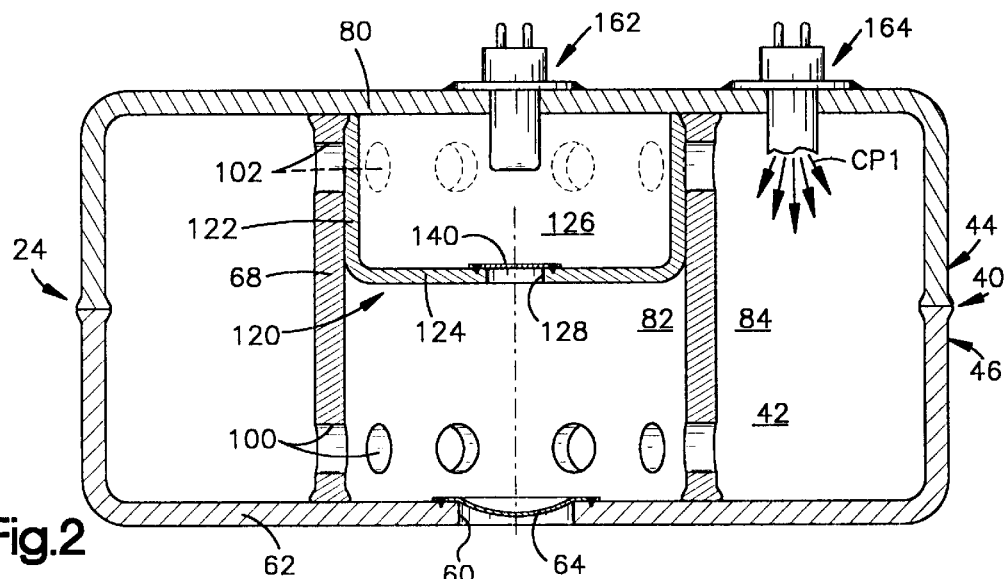
FIGS. 2–4 are sectional views of the inflator of FIG. 1 illustrating one mode of operation.
Figure 3:
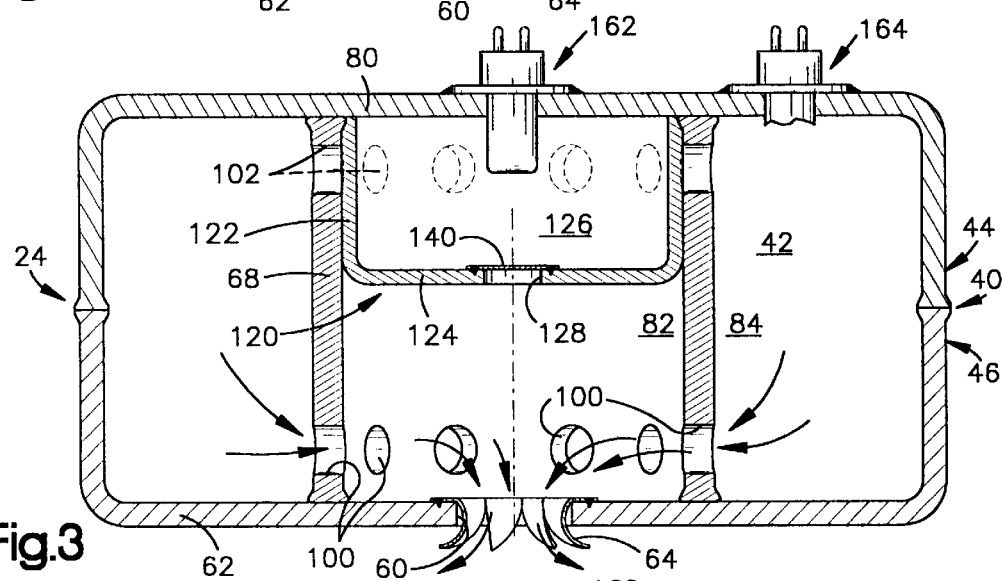
Figure 4:
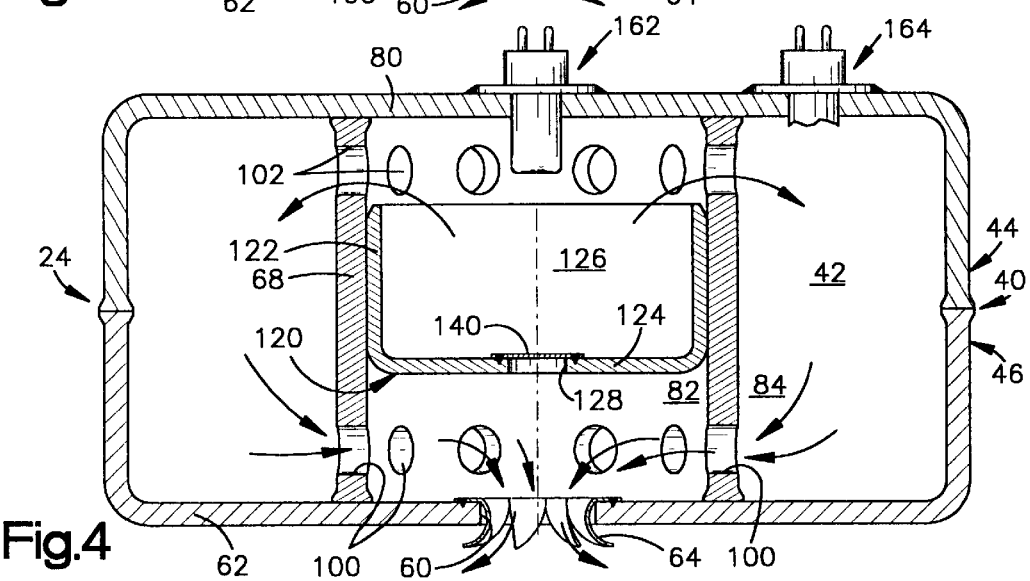
Figure 5:
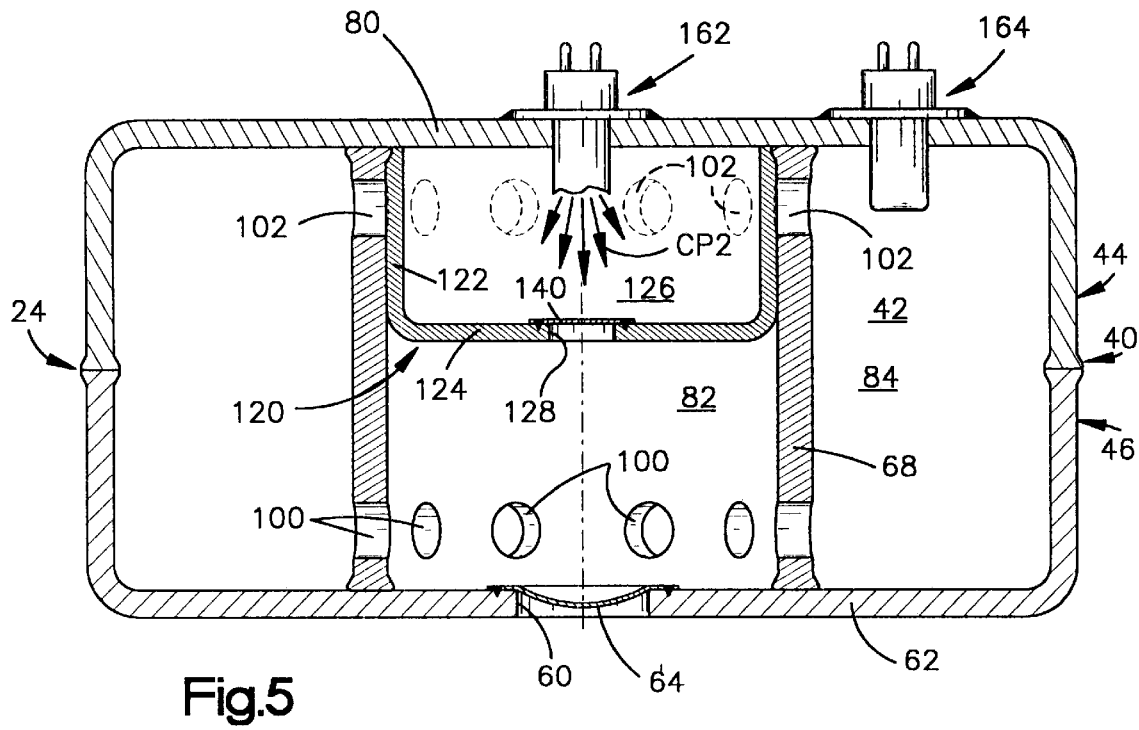
FIGS. 5 and 6 are sectional views of the inflator of FIG. 1 illustrating another mode of operation.
Figure 6:
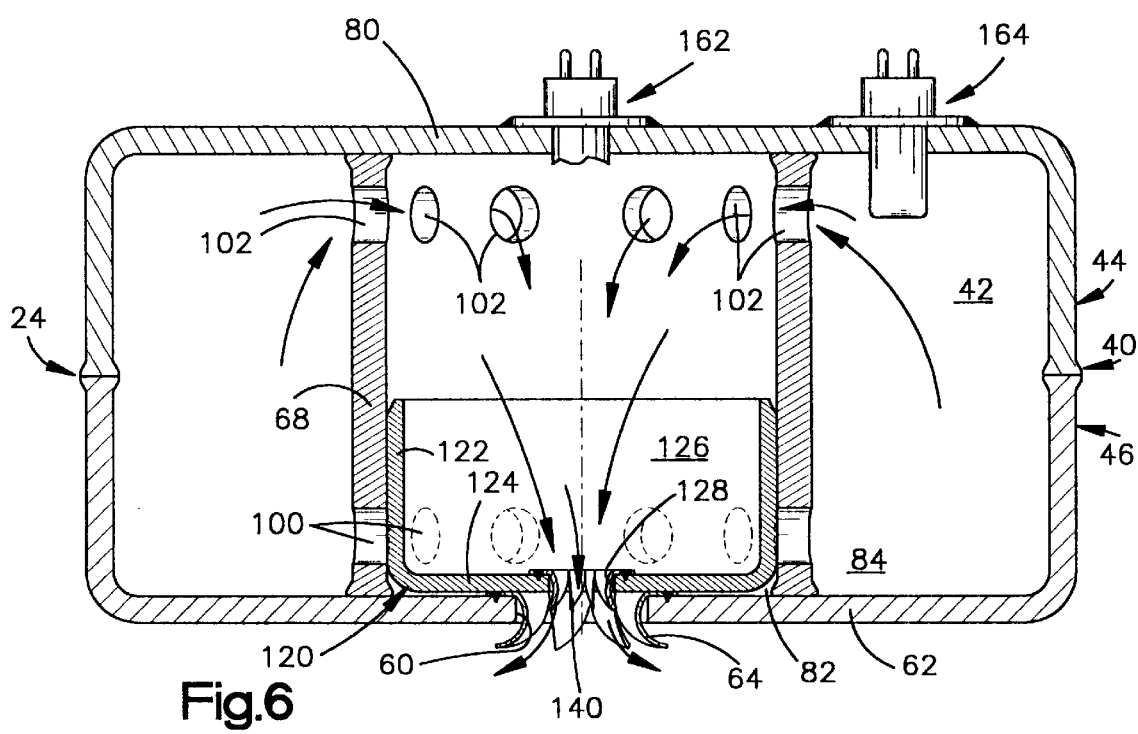

The piston member 120 is movable within the inner chamber portion 82 relative to the guide wall 68 in a direction along the axis A of the container 40. The piston member 120 is initially located in a position adjacent the end wall 80 of the upper container portion 44 and spaced from the end wall 62 of the lower container portion 46, as illustrated in FIGS. 1–3 and 5. The piston member 120 is movable from the initial position in a direction towards the end wall 62 of the lower container portion 46. For example, the piston member 120 may move to an intermediate position between the passages 100 in the guide wall 68 and the passages 102 in the guide wall, as illustrated in FIG. 4. The piston member 120 is also movable to an end position adjacent the end wall 62 of the lower container portion 46, as illustrated in FIG. 6.

When the piston member 120 is located in the initial or intermediate positions, fluid flow through the opening 60 in the container 40 is not restricted. When the piston member 120 is located in the initial position adjacent the end wall 80 of the upper container portion 44, fluid flow through the passages 100 in the lower end portion of guide wall 68 is permitted. The piston side wall 122 of the piston member 120 concurrently inhibits fluid flow through the passages 102 in the upper end portion of the guide wall 68. When the piston member 120 is located in the intermediate position, fluid flow through both the passages 100 and the passages 102 is permitted.

When the piston member 120 moves to the end position, the opening 128 in the piston end wall 124 overlies the opening 60 in the end wall 62 of the lower container portion 46. A portion of the piston end wall 124 around the opening 128 restricts fluid flow through the opening 60 when the closure 64 is ruptured. Fluid thus may flow through the opening 128 and the opening 60 to inflate the air bag 22 at a relatively lower rate of inflation than if fluid flow through the opening 60 were unrestricted. When the piston member 120 is located in the end position adjacent the end wall 62 of the lower container portion 46, as illustrated in FIG. 6, fluid flow through the passages 102 in the upper end portion of the guide wall 68 is permitted. The piston side wall 122 of the piston member 120 concurrently inhibits fluid flow through the passages 100 in the lower end portion of the guide wall 68.

The end wall 80 of the upper container portion 44 supports a pair of actuatable initiators 162, 164. The initiators 162, 164, upon actuation, produce combustion products which include heat and hot particles. Each of the initiators 162, 164 is cylindrical in shape and extends in a direction substantially parallel to the axis A. An end of the initiator 162 is located in the chamber 126 of the chamber 42. An end of the initiator 164 is located in the outer chamber portion 84 of the chamber 42.

The actuation circuit 26 (FIG. 1) includes a source 180 of electrical power, an event sensor 182, a controller 184 and a condition sensor 186. The event sensor 182 includes a normally open switch 188 that closes in response to sensing an event, such as a collision or deceleration of the vehicle, for which inflation of the air bag 22 is desired. The event sensor 182 is connected between the power source 180 and the controller 184 to permit the delivery of electrical energy to at least one of the initiators 162, 164, when the switch 188 is closed.

The initiator 162 is connected to the controller 184 by lead wires 200. The initiator 164 is connected to the controller 184 by lead wires 202. The controller 184 is connected to the condition sensor 186 by lead wires 204. When the event sensor 182 communicates an electrical signal to the controller 184, the controller 184 triggers actuation of only one of the initiators 162, 164.

The controller 184 uses a signal from the condition sensor 186 to calculate which of the initiators 162, 164 is to be actuated. This calculation enables the inflator 24 to provide inflation fluid to the air bag 22 at a desired rate of inflation. The rate of inflation of the air bag 22 depends on at least one of various factors, such as occupant weight, distance that the occupant is from the air bag, position or orientation of the occupant on a vehicle seat, vehicle speed, severity of the crash, temperature within the passenger compartment, and the like. Any one of these factors, which is sensed by the condition sensor 186, may be used by the controller 184 to calculate which of the initiators 162, 164 is to be actuated. It will be apparent that more than one condition sensor may be necessary if the controller 184 uses more than one of these factors to calculate which of the initiators 162, 164 is to be actuated. The rate of inflation of the air bag 22 thus can be varied as conditions warrant.

In operation, the controller 184 (FIG. 1) delivers electrical energy to one of the initiators 162, 164 when the switch 188 in the event sensor 182 closes. The controller 184 also has at least one signal communicated over wires 204 from the condition sensor 186, which may be indicative of at least one factor at the time of a collision or vehicle deceleration when inflation of the air bag 22 is desired. Other conditions may be sensed and input to the controller 184. The controller 184 then calculates if the air bag 22 is to be inflated with a relatively high rate of inflation or a relatively low rate of inflation and determines which of the initiators 162 or 164 is to be actuated.

The initiator 164 is actuated when the controller 184 determines that the air bag 22 is to be inflated at a relatively high rate of inflation. Upon actuation, the initiator 164 releases combustion products CP1 into the outer chamber portion 84 of the chamber 42 to ignite the combustible gas in the mixture of gases, as illustrated in FIG. 2. Combustion of the combustible gas heats the mixture of gases in the outer chamber portion 84. The combustible gas in the mixture of gases in the inner chamber portion 82 also ignites. Pressure in the chamber portions 82, 84 of the chamber 42 increases to the predetermined pressure and ruptures the closure 64, as illustrated in FIG. 3. When the closure 64 ruptures, fluid flows from the chamber 42 through the unrestricted opening 60 to inflate the air bag 22 at the relatively high rate of inflation.

When the piston member 120 is in its initial position, the piston side wall 122 inhibits fluid flow through the passages 102 in the upper end portion of guide wall 68. The piston member 120 allows fluid flow through the passages 100 in the lower end portion of the guide wall 68 from the outer chamber portion 84 to the inner chamber portion 82. As fluid flows through the opening 60 in the container 40 to inflate the air bag 22, pressure in the chamber portions 82, 84 decreases. Pressure in the chamber 126 remains relatively higher than the pressure in the chamber portions 82, 84.

The pressure differential between the chamber 126 and the chamber portions 82, 84 forces the piston member 120 to move in a direction along the axis A toward the end wall 62. When the piston member 120 moves to the intermediate position, as illustrated in FIG. 4, the piston side wall 122 no longer covers the passages 102 in the upper end portion of the guide wall 68. Hot gas from the outer chamber portion 84 enters the expanded chamber 126 through the passages 102.

Combustible gas in the mixture of gases in the chamber 126 ignites to heat and pressurize the mixture of gases. The pressurized mixture of gases from the chamber 126 flows into the outer chamber portion 84 through the passages 102 in the guide wall 68. The pressurized mixture of gases flows into the inner chamber portion 82 through the passages 100 below the piston member 120 and into the air bag 22 through the opening 60, as illustrated in FIG. 4. The pressure in the chamber 126 eventually equals the pressure in the chamber portions 82, 84 so the piston member 120 remains in the intermediate position and fluid flow through the opening 60 is not restricted by the end wall 124 of the piston member.

The initiator 162 is actuated when the controller 184 determines that the air bag 22 is to be inflated at the relatively low rate of inflation. Upon actuation, the initiator 162 produces combustion products CP2 (FIG. 5) which are released into the mixture of gases in the chamber 126. The combustion products CP2 produced by the initiator 162 ignite the combustible gas in the mixture of gases. Combustion of the combustible gas heats the mixture of gases in the chamber 126. Pressure in the chamber 126 increases and acts on the piston end wall 124 of the piston member 120 to move the piston member in a direction toward the end wall 62 of the lower container portion 46 of the container 40. The piston member 120 moves from the initial position illustrated in FIG. 5, to the end position, illustrated in FIG. 6. The increased pressure in the chamber 126 also ruptures the closure 140. The piston side wall 122 blocks the passages 100 in the lower end portion of guide wall 68 and the upper passages 102 are not blocked.

As the piston sidewall 122 moves to uncover the passages 102, ignited combustible gas in the chamber 126 is released into the chamber portions 82, 84. The combustible gas portion in the mixture of gases in the chamber portions 82, 84 of the chamber 42 ignites to heat the mixture of gases. Pressure in the chamber 42 increases to the predetermined pressure to rupture the closure 64. The portion of the piston member 120 around the opening 128 restricts flow through the opening 60. Fluid flows through the opening 128 in the piston member 120 and the opening 60 in the container 40 to inflate the air bag 22 at the relatively low rate of inflation.

From the above description of the invention, those skilled in the art will perceive improvements, changes and modifications. For example, although the chamber 42 is described as receiving and storing the mixture of gases under pressure, the gases could be stored at another location or several locations in the vehicle and then delivered to the chamber upon the occurrence of a collision or vehicle deceleration. The initiator 162 could be actuated after the initiator 164 is actuated to provide an initially high rate of inflation to the air bag 22 which decreases to a relatively low rate of inflation. Such improvements, changes and modifications within the skill of the art are intended to be covered by the appended claims.

Having described the invention, the following is claimed:

1. An apparatus for inflating an inflatable vehicle occupant protection device, said apparatus comprising:

a container defining a chamber for material which effects inflation of the protection device, said container including a first opening of a first flow area through which fluid flows to inflate the protection device;

a rupturable first closure blocking fluid flow through the first opening in said container;

first actuatable means for, upon actuation, effecting the rupture of said first closure;

a member movable from a first position in which the fluid flow through the first opening is unrestricted when said first closure is ruptured to a second position in which fluid flow through the first opening is restricted by a portion of said member; and second actuatable means for, upon actuation, moving said member from the first position to the second position and effecting the rupture of said first closure.

2. The apparatus of claim 1 wherein said member includes a second opening of a second flow area through which fluid flows to inflate the protection device when said member is in the second position, the second flow area being less than the first flow area.

3. The apparatus of claim 2 further including a rupturable second closure which inhibits flow through the second opening, said second closure rupturing in response to actuation of said second actuatable means.

4. The apparatus of claim 2 wherein fluid flows through the first and second openings when said member is in the second position.

5. The apparatus of claim 2 wherein the rate at which fluid flows through the second opening in said member to inflate the protection device when said member is in the second position is less than the rate at which fluid flows through the first opening in said container to inflate the protection device when said member is in a position other than the second position.

6. The apparatus of claim 1 wherein said member is located within said container.

7. The apparatus of claim 1 further including means for guiding movement of said member from the first position to the second position.

8. The apparatus of claim 7 wherein said guiding means is located in said chamber and comprises a guide wall fixed to said container and extending around the first opening, said guide wall including a first passage and a second passage which permit fluid flow between opposite sides of said guide wall, the first passage being spaced from the second passage, said member in the first position allowing fluid flow through the first passage in said guide wall and said member in the second position allowing fluid flow through the second passage in said guide wall.

9. The apparatus of claim 1 further including control means for actuating only one of said first and second actuatable means.

10. The apparatus of claim 1 wherein said material in the chamber comprises fluid under pressure, said first and second actuatable means producing, upon actuation, combustion products which effect the heating of fluid in the chamber and increase the pressure in the chamber to a predetermined pressure at which said first closure ruptures.

11. The apparatus of claim 10 wherein said fluid comprises a mixture of gases including a combustible gas and an inert gas, and combustion products produced by said first and second actuatable means ignite said combustible gas to heat the inert gas and increase pressure in the chamber.

12. An apparatus for inflating an inflatable vehicle occupant protection device, said apparatus comprising:

a container defining a chamber for holding fluid under pressure, said container including a wall having a first opening of a first flow area through which fluid flows to inflate the protection device;

a rupturable first closure blocking fluid flow through the first opening;

first actuatable means for producing combustion products which effect the heating of fluid in the chamber to increase the pressure in the chamber to a predetermined pressure at which said first closure ruptures;

a guide;

a member having a second opening of a second flow area through which fluid flows to inflate the protection device, the second flow area being less than the first flow area, said member being movable from a first position spaced from said wall in which fluid flow through the first opening is unrestricted when said first closure is ruptured to a second position adjacent said wall in which fluid flow through the first opening is restricted by a portion of said member and fluid flows through the second opening in said member;

a rupturable second closure inhibiting fluid flow through the second opening; and second actuatable means for producing combustion products which cause said member to move from the first position to the second position and effect the heating of fluid in the chamber to increase the pressure in the chamber to a predetermined pressure at which said second closure ruptures.

13. The apparatus of claim 12 wherein said guide and said member are located in the chamber, said guide comprises a portion extending in a direction away from said wall of said container.

14. The apparatus of claim 13 wherein said guide extends around the first opening and has a first passage and a second passage spaced from the first passage, fluid being permitted to flow through the first passage in said guide when said member is in the first position, and fluid being permitted to flow through the second passage in said guide when said member is in the second position.

15. The apparatus of claim 12 wherein said fluid comprises a mixture of gases including a combustible gas and an inert gas, combustion products produced by said first and second actuatable means igniting said combustible gas to heat the inert gas and increase the pressure in the chamber.

16. An apparatus for inflating an inflatable vehicle occupant protection device, said apparatus comprising:

a container defining a chamber for holding a mixture of gases including a combustible gas and an inert gas, said container having a first opening of a first flow area through which gas flows to inflate the protection device;

a rupturable first closure blocking fluid flow through the first opening;

a member having a second opening of a second flow area through which gas flows to inflate the protection device, the second flow area being less than the first flow area, said member being movable from a first position in which gas flow through the first opening in said container is unrestricted to a second position in which gas flow through the first opening is restricted by a portion of said member;

first actuatable means for igniting combustible gas in a first portion of the chamber to rupture said first closure; and second actuatable means for igniting combustible gas in a second portion of the chamber to move said member from the first position to the second position and rupture said first closure.

17. The apparatus of claim 16 further including a rupturable second closure inhibiting fluid flow through the second opening, said second closure rupturing in response to actuation of said second actuatable means.

18. The apparatus of claim 16 further including means for guiding movement of said member in the chamber from the first position to the second position.

19. The apparatus of claim 18 wherein said guiding means comprises a guide wall extending around the first opening, said guide wall including a first passage and a second passage which permit fluid flow through said guide wall between opposite sides of said guide wall, the first passage being spaced from the second passage in a direction substantially parallel to the direction in which said member moves, said member being guided by said guide wall for movement from the first position in which fluid flows through the first passage in said guide wall to the second position in which fluid flows through the second passage in said guide wall.

20. The apparatus of claim 16 further including control means for actuating only one of said first and second actuatable means.

* * * * *